(12) United States Patent
Arakawa (10) Patent No.: US 9,438,363 B2
(45) Date of Patent: Sep. 6, 2016

(54) COMMUNICATION DEVICE, COMMUNICATION SYSTEM, AND SYNCHRONOUS CONTROL METHOD

(75) Inventor: Satoshi Arakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

(21) Appl. No.: 14/406,574

(22) PCT Filed: Aug. 1, 2012

(86) PCT No.: PCT/JP2012/069602
§ 371 (c)(1),
(2), (4) Date: Dec. 9, 2014

(87) PCT Pub. No.: WO2014/020726
PCT Pub. Date: Feb. 6, 2014

(65) Prior Publication Data
US 2015/0180598 A1 Jun. 25, 2015

(51) Int. Cl.
*H04J 3/06* (2006.01)
*H04L 12/40* (2006.01)
*G05B 15/02* (2006.01)
*H04L 7/04* (2006.01)
*H04L 7/00* (2006.01)

(52) U.S. Cl.
CPC ............ *H04J 3/0602* (2013.01); *G05B 15/02* (2013.01); *H04J 3/0658* (2013.01); *H04L 7/0008* (2013.01); *H04L 7/04* (2013.01); *H04L 12/40* (2013.01); *H04J 3/0682* (2013.01); *H04L 2012/4026* (2013.01)

(58) Field of Classification Search
None
See application file for complete search history.

(56) References Cited

U.S. PATENT DOCUMENTS 5,461,617 A * 10/1995 Takebe .................. H04L 12/423
370/424
2008/0147340 A1 * 6/2008 Gebara .............. G01R 31/3016
702/69

(Continued)

FOREIGN PATENT DOCUMENTS

JP 11-224126 A 8/1999
JP 11-305812 A 11/1999
JP 2000-020119 A 1/2000

(Continued)

OTHER PUBLICATIONS

International Search Report for PCT/JP2012/069602 dated Sep. 11, 2012.

*Primary Examiner* — Hassan Kizou
*Assistant Examiner* — Ashil Farahmand
(74) *Attorney, Agent, or Firm* — Sughrue Mion, PLLC (57) ABSTRACT

A communication device includes a transmission port and a reception port communicating with other network units, a system bus I/F unit communicating with a synchronous target, n (n is an integer of 2 or more) delay counters counting a predetermined period of time, a delay-counter control unit that, upon receiving a synchronous packet input with a predetermined cycle from the reception port, causes the delay counters to count a cycle that is n times as long as the predetermined cycle and controls the delay counters such that counts of the delay counters are cleared at different timings, and a synchronous-pulse output unit outputting a synchronous pulse to the synchronous target through the system bus I/F unit when there is the counter whose count value after being cleared becomes equal to a synchronous-pulse output value.

9 Claims, 9 Drawing Sheets

(56) References Cited

U.S. PATENT DOCUMENTS

| | | |
|---|---|---|
| 2010/0008383 A1 | 1/2010 | Koga et al. |
| 2010/0220749 A1 | 9/2010 | Colmant et al. |

FOREIGN PATENT DOCUMENTS

| | | |
|---|---|---|
| JP | 2003-058212 A | 2/2003 |
| JP | 2005-014149 A | 1/2005 |
| JP | 2005-524343 A | 8/2005 |
| JP | 2006-285885 A | 10/2006 |
| JP | 2010-244505 A | 10/2010 |
| JP | 2011-123688 A | 6/2011 |
| JP | 2011-170476 A | 9/2011 |
| JP | 2012-060207 A | 3/2012 |
| WO | 2008/123272 A1 | 10/2008 |

* cited by examiner

COMMUNICATION DEVICE, COMMUNICATION SYSTEM, AND SYNCHRONOUS CONTROL METHOD

CROSS REFERENCE TO RELATED APPLICATIONS

This application is a National Stage of International Application No. PCT/JP2012/069602 filed Aug. 1, 2012, the contents of all of which are incorporated herein by reference in their entirety.

FIELD

The present invention relates to a communication device, a communication system, and a synchronous control method.

BACKGROUND

In a motion control system such as a machine tool, a semiconductor manufacturing device, and an industrial robot, in which a highly precise operating motion using a plurality of axes is required, a motion controller and a plurality of controlled axes need to operate in synchronization with each other.

A technique has been proposed for a conventional motion control system, in which the same interpolation command is input to a plurality of motion controllers, and the motion controllers generate servo position commands or servo torque commands for a plurality of servo drives at slightly different timings from each other and transmit the commands to the servo drives, in order that even a multi-axis interpolation command, which cannot be processed with a desired control cycle by a single motion controller, can still be output to the servo drives with the desired control cycle (see, for example, Patent Literature 1).

According to the technique described in Patent Literature 1, in a motion control system in which a motion controller and a plurality of servo drives are connected by a high-speed serial bus or serial communication that does not have a synchronous communication function, the motion controller outputs a motion command to the servo drives by a start-up interrupt at set time intervals and outputs a time-clear request to the servo drives by a start-up interrupt that is delayed by a set time from the output of the motion command. The servo drive delays execution of the time-clear request from the motion controller by a set time and clears the timer in the servo drive. With this configuration, the servo control processing is performed simultaneously in the servo drives.

CITATION LIST

Patent Literature

Patent Literature 1: Japanese Patent Application Laid-open No. 2010-244505

SUMMARY

Technical Problem

However, according to the technique described in Patent Literature 1, after the motion controller transmits a motion command such as a position command, the servo drive, located relatively a short physical distance from the motion controller, and the servo drive, located relatively a long physical distance from the motion controller, receive the motion command at different timings. In order to operate the servo drives in synchronization with each other, the servo drives that have received the motion command earlier are brought into a standby state until the last servo drive receives the motion command. Therefore, as the communication distance between the motion controller and a synchronous target is extended or as the number of servo drives that are synchronous targets is increased, the delay time is increased. As the delay time is increased, the period of time from when a motion command such as a position command is transmitted from the motion controller to the servo drives to when an actual start-up interrupt is output is extended. Therefore, there is a problem in that a desired start-up cycle cannot be achieved.

The present invention has been achieved in view of the above and an object of the present invention is to provide a communication device, a communication system, and a synchronous control method that can suppress an increase in the period of time from when a motion command is transmitted from a motion controller to servo drives to when an actual start-up interrupt is output, even when the number of the servo drives connected to the motion controller in a motion control system is increased.

Solution to Problem

In order to achieve the above object, the communication device according to the present invention including: a first communication unit that communicates with another communication device; a second communication unit that communicates with a synchronous target; n (n is an integer of 2 or more) counters that count a predetermined period of time; a counter control unit that, upon receiving a synchronous packet input with a predetermined cycle from the first communication unit, causes the counters to count a cycle that is n times as long as the predetermined cycle and controls the counters such that counts of the counters are cleared at different timings; and a synchronous-pulse output unit that outputs a synchronous pulse to the synchronous target through the second communication unit when there is a counter whose count value after being cleared becomes equal to a synchronous-pulse output value.

Advantageous Effects of Invention

According to the present invention, a communication device includes n counters and a counter control unit that, upon receiving a synchronous packet input with a predetermined cycle, causes the counters to count a cycle that is n times as long as the predetermined cycle and controls the counters such that counts of the counters are cleared at different timings. Therefore, an effect is obtained where even during waiting for a synchronous packet to arrive at a distal control target by using one of the counters, the communication device can still receive the next synchronous packet. Further, each time the value of any of a plurality of delay counters becomes a synchronous-pulse output value, a synchronous pulse is output. Therefore, an effect is obtained where a synchronous pulse can be output with a shorter cycle than the case with a single delay counter.

DESCRIPTION OF EMBODIMENTS

Preferable embodiments of a communication device, a communication system, and a synchronous control method according to the present invention will be explained below in detail with reference to the accompanying drawings. The present invention is not limited to the embodiments.

Figure 1:
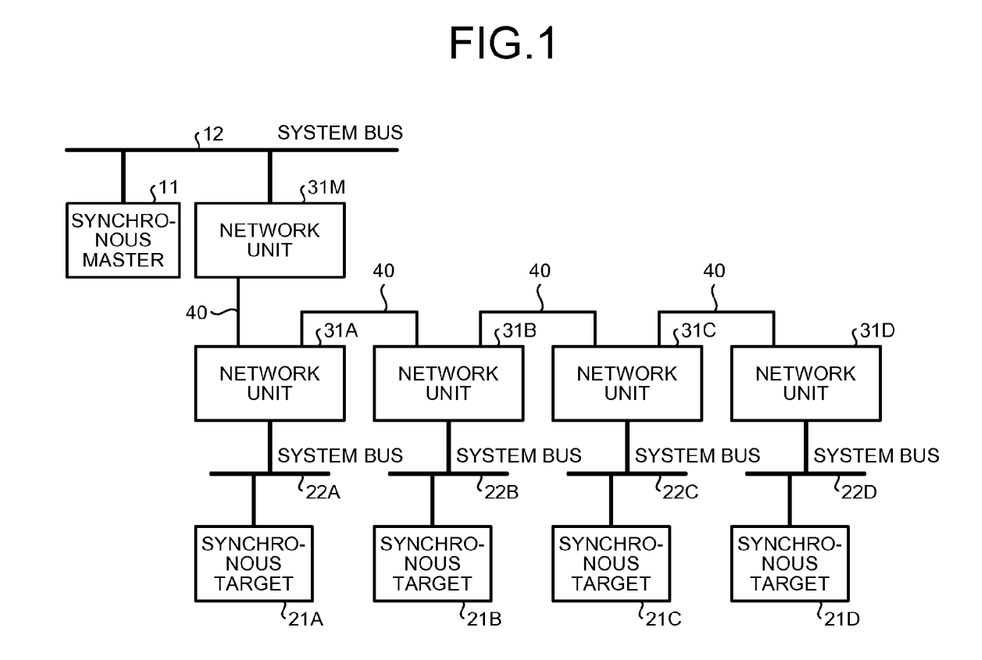
FIG. 1 is a schematic diagram showing an example of the configuration of a motion control system to which the present embodiment is applied.

FIG. 1 is a schematic diagram showing an example of the configuration of a motion control system to which the present embodiment is applied. The motion control system has a configuration in which a synchronous master 11 such as a motion controller and synchronous targets 21A to 21D such as servo drives are connected through a network 40.

The synchronous master 11 and a network unit 31M are connected through a system bus 12. The synchronous target 21A and a network unit 31A are connected through a system bus 22A. Similarly, the other synchronous targets 21B to 21D and network units 31B to 31D are connected respectively through system buses 22B to 22D. The network unit 31M and the network units 31A to 31D are connected in-line through the network 40 such as the Ethernet®. In this example, the motion control system is configured by the network unit 31M connected to the synchronous master 11 and the network units 31A to 31D connected respectively to four synchronous targets 21A to 21D. However, the number of network units is not specifically limited thereto. The network topology of the network unit 31M and the network units 31A to 31D is not limited to the line topology, and can be a star topology or a ring topology, or can combine these topologies.

Figure 2:
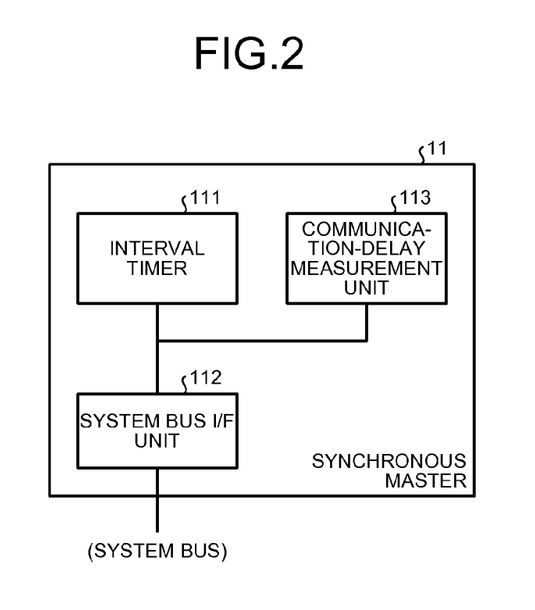
FIG. 2 is a block diagram schematically showing a part of a functional configuration of a synchronous master.

FIG. 2 is a block diagram schematically showing a part of a functional configuration of a synchronous master. The synchronous master 11 includes an interval timer 111, a system bus interface (hereinafter, "I/F") unit 112, and a communication-delay measurement unit 113. Other basic functions of the synchronous master 11 such as the motion controller are not shown in FIG. 2.

The interval timer 111 generates a start-up interrupt at predetermined time intervals and starts up the motion processing in a processing unit (not shown).

The system bus I/F unit 112 has a function of transmitting and receiving a command to and from the system bus 12 and inputting and outputting a control signal from and to the system bus 12. In the present embodiment, the type of the system bus 12 is not limited, and can be a serial bus, a parallel bus, or the like. A synchronous pulse output from the system bus I/F unit 112 notifies all the network units 31A to 31D connected through the system bus 12 of the synchronous timing. When the synchronous pulse is output to the system bus 12 in the form of a synchronous packet, the synchronous timing can be notified to a specific unit.

The communication-delay measurement unit 113 measures a delay time from when the synchronous master 11 outputs a synchronous pulse to when the synchronous pulse is input to the network units 31A to 31D, to which the synchronous targets 21A to 21D are respectively connected. While a method of measuring the delay time is not particularly limited, the delay time can be measured using standards such as IEEE 1588. The measured delay time is stored in a synchronous-pulse output-value storage unit in each of the network units 31A to 31D.

Figure 3:
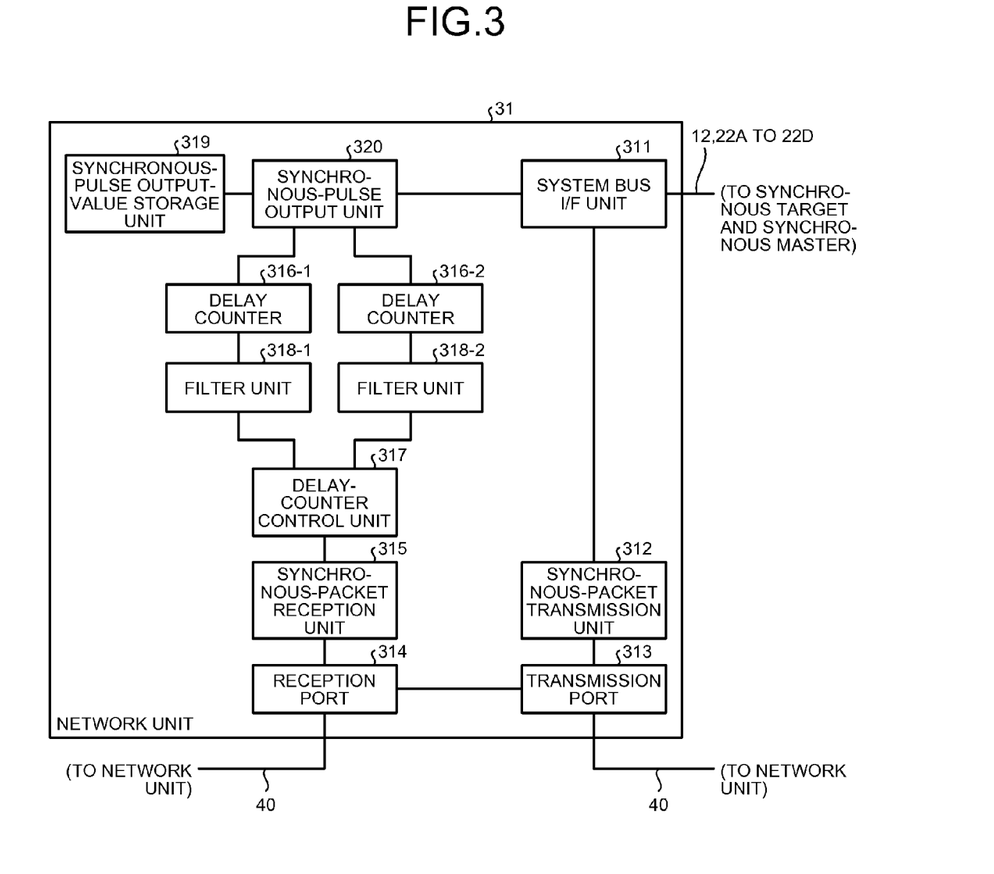
FIG. 3 is a diagram schematically showing an example of the functional configuration of a network unit.

The network unit 31M and the network units 31A to 31D have a function of communicating with each other through the network 40 with a fixed cycle. The network unit 31M and the network units 31A to 31D have various functions related to communication. However, explanations of the functions of the network unit 31M and the network units 31A to 31D are focused herein only on the synchronous function related to the present embodiment. FIG. 3 is a diagram schematically showing an example of the functional configuration of a network unit. The network unit 31M connected to the synchronous master 11 in FIG. 1 and the network units 31A to 31D connected respectively to the synchronous targets 21A to 21D in FIG. 1 have the same configuration, and are thus represented as a network unit 31 in FIG. 3 to explain its configuration.

The network unit 31 includes a system bus I/F unit 311, a synchronous-packet transmission unit 312, a transmission port 313, a reception port 314, a synchronous-packet reception unit 315, delay counters 316-1 and 316-2, a delay-counter control unit 317, filter units 318-1 and 318-2, a synchronous-pulse output-value storage unit 319, and a synchronous-pulse output unit 320. While in the example according to the present embodiment, the network unit 31 has a configuration in which two delay counters 316-1 and 316-2 and two filter units 318-1 and 318-2 are provided, the number of delay counters and the number of filter units are not limited. Further, it is assumed that there are other general functions that constitute the network unit, such as a microcomputer, a memory, and a clock, although they are not explicitly shown in FIG. 3.

Similarly to the system bus I/F unit 112 in the synchronous master 11, the system bus I/F unit 311 has a function of transmitting and receiving a command to and from the system bus 12 and the system buses 22A to 22D and inputting and outputting a control signal from and to the system bus 12 and the system buses 22A to 22D.

The synchronous-packet transmission unit 312 uses a synchronous pulse received by the system bus I/F unit 311 as a trigger to generate a synchronous packet to other network units and outputs the generated synchronous packet to the transmission port 313. In the present embodiment, the format of a synchronous packet is not particularly limited. For example, 1-bit flag information indicating whether the arriving packet is a synchronous packet can be stored in the header or the data area of the Ethernet® to form a synchronous packet. In the synchronous-packet transmission unit 312, a synchronous packet can include clear-counter designation information designating which of the delay counters 316-1 and 316-2 is to be cleared.

The transmission port 313 and the reception port 314 are I/Fs for transmitting and receiving a packet to and from the network 40. While the topology of the network 40 is not limited, the network 40 has a line topology in this example. Therefore, the network unit 31 includes two communication ports that are the transmission port 313 and the reception port 314. The number of communication ports can be one if the network 40 has a star topology. Further, the transmission port 313 and the reception port 314 can be configured by a single port having both of their functions.

The synchronous-packet reception unit 315 has a function of receiving and analyzing a synchronous packet addressed to it from the reception port 314 or the transmission port 313. When the synchronous-packet reception unit 315 receives a synchronous packet, the synchronous-packet reception unit 315 notifies the delay-counter control unit 317 of the arrival of the synchronous packet. In the above example, whether the arriving packet is a synchronous packet is determined by confirming the flag information indicating whether the arriving packet is a synchronous packet, which is provided in the header or the data area of the Ethernet®. Further, when the synchronous packet includes the clear-counter designation information, the synchronous-packet reception unit 315 notifies the delay-counter control unit 317 of the arrival of the synchronous packet and also the delay counters 316-1 and 316-2 to be cleared.

The delay counters 316-1 and 316-2 have a function of counting up in synchronization with a clock. While in the present embodiment, the network unit 31 includes two delay counters 316-1 and 316-2, it suffices that the network unit 31 includes a plurality of delay counters.

The delay-counter control unit 317 controls operations of the delay counters 316-1 and 316-2, which are start, stop, and reset. Specifically, the delay-counter control unit 317 receives information regarding the arrival of the synchronous packet and regarding the delay counters 316-1 and 316-2 that are synchronous targets from the synchronous-packet reception unit 315, and clears the target delay counter 316-1 or 316-2.

In the present embodiment, the delay-counter control unit 317 causes the delay counters 316-1 and 316-2 to count a predetermined cycle that is longer than the cycle of outputting a synchronous pulse to each of the synchronous targets 21A to 21D. For example, the cycle to be counted can be a period of time that is longer than the delay time in the network unit 31D located at the longest physical distance from the synchronous master 11 via the network 40 relative to the network unit 31A located at the shortest physical distance from the synchronous master 11 via the network 40. The delay counters 316-1 and 316-2 are controlled so as to start counting at different timings. Specifically, the delay-counter control unit 317 causes each of the delay counters 316-1 and 316-2 to start counting with a time lag of a value obtained by dividing the cycle, to be counted by the delay counters 316-1 and 316-2, by the number of the delay counters 316-1 and 316-2. With this configuration, it is possible for the delay-counter control unit 317 to measure a cycle that is shorter than the count cycle of the delay counters 316-1 and 316-2 (at a fraction of the count cycle of the delay counters 316-1 and 316-2) by using the delay counters 316-1 and 316-2.

The filter units 318-1 and 318-2 have a function of controlling the synchronous-packet receivable time range. Specifically, because a synchronous packet is expected to be delivered with a fixed cycle, this function is to eliminate a synchronous packet delivered outside the fixed cycle for some reasons so as to prevent the synchronous packet delivered outside the fixed cycle from disrupting the synchronous timing. In the conventional technique, a delay counter is cleared by the arrival of a synchronous packet in a one-to-one correspondence. However, in the present embodiment, because there are a plurality of the delay counters 316-1 and 316-2, a synchronous packet needs to select which of the delay counters 316-1 and 316-2 is to be cleared. As a selection method for this, the delay counters 316-1 and 316-2 to be cleared can be brought into a one-to-one correspondence with the filter units 318-1 and 318-2, for example.

The synchronous-pulse output-value storage unit 319 stores therein a synchronous-pulse output value that can be set within a range that can be obtained by the delay counters 316-1 and 316-2. Specifically, the delay time from when the synchronous master 11 outputs a synchronous pulse to when the synchronous pulse arrives at the network units 31A to 31D, to which the synchronous targets 21A to 21D are respectively connected, is set in the synchronous-pulse output-value storage unit 319. This synchronous-pulse output value that is a value measured by the communication-delay measurement unit 113 in the synchronous master 11 is stored in the synchronous-pulse output-value storage unit 319.

The synchronous-pulse output unit 320 compares a synchronous-pulse output value stored in the synchronous-pulse output-value storage unit 319 to all the values of the delay counters 316-1 and 316-2. When at least one of the values of the delay counters 316-1 and 316-2 corresponds with the synchronous-pulse output value, the synchronous-pulse output unit 320 outputs a synchronous pulse to the system buses 22A to 22D through the system bus I/F unit 311. A synchronous pulse sometimes notifies other network units of the synchronous timing through a system bus and thus can take the form of a synchronous packet or other forms.

In the network unit 31 having the structure as described above, the cycle that is half of the cycle to be counted by the delay counters 316-1 and 316-2 can be measured. When each value of the delay counters 316-1 and 316-2 becomes equal to the synchronous-pulse output value in the synchronous-pulse output-value storage unit 319, the synchronous-pulse output unit 320 outputs a synchronous pulse to the synchronous targets 21A to 21D through the system bus I/F unit 311. With this configuration, a synchronous pulse can be output with a cycle that is half of the count cycle of the delay counters 316-1 and 316-2, and also all the network units 31 in the system can synchronize with each other at a timing that takes into account a delay in the arrival time of a signal from the synchronous master 11.

Next, an explanation will be given of a synchronous control method in the motion control system, as shown in FIG. 1, that includes the synchronous master 11, the network unit 31M connected to the synchronous master 11, the synchronous targets 21A to 21D, and the network units 31A to 31D connected respectively to the synchronous targets 21A to 21D. In this example, each of the network unit 31M and the network units 31A to 31D includes two delay counters 316-1 and 316-2 as shown in FIG. 3.

<Operation of Synchronous Master 11>

The synchronous master 11 outputs a synchronous pulse through the system bus I/F unit 112 regularly by using the interval timer 111. In this example, the synchronous master 11 is supposed to output a synchronous pulse regularly at times t1, t2, t3, t4, t5, . . . .

<Operation of Network Unit 31M>

The network unit 31M, which is connected to the system bus 12 to which the synchronous master 11 is also connected, receives a synchronous pulse from the synchronous master 11 at the times t1, t2, t3, . . . , inputs the synchronous pulse to the system bus I/F unit 311, and notifies the synchronous-packet transmission unit 312 of the arrival of the synchronous packet.

Upon being notified of the arrival of the synchronous packet at the times t1, t2, t3, . . . , the synchronous-packet transmission unit 312 creates a synchronous packet and transmits the synchronous packet from the transmission port 313 to all the network units 31A to 31D connected to the network 40. For ease of explanation, it is assumed that there is no delay from arrival of a synchronous pulse to transmission of the synchronous packet.

<Operation of Network Unit 31A>

Next, in the network unit 31A, a synchronous packet from the network unit 31M arrives at the reception port 314. Because the synchronous packet is addressed to all the networks, the reception port 314 has the synchronous packet input thereto and forwards the synchronous packet to the synchronous-packet reception unit 315 and also to the transmission port 313. The transmission port 313 then transmits the synchronous packet to the network 40. This operation to forward the synchronous packet from the reception port 314 to the transmission port 313 is needed to transmit this packet to all the networks 40 because the network topology is a line in the example of the explanations. However, this operation is not needed in a case where the network topology is a star, for example.

The synchronous-packet reception unit 315 within the network unit 31A then analyzes the arriving packet forwarded by the reception port 314 and determines whether the arriving packet is a synchronous packet. When the arriving packet is a synchronous packet, the synchronous-packet reception unit 315 notifies the filter units 318-1 and 318-2 of the arrival of the synchronous packet.

The delay time from when a synchronous packet is delivered from the network unit 31M to the network unit 31A to when the arrival of the synchronous packet is notified to the filter units 318-1 and 318-2 in the network unit 31A is defined as $\beta$. This delay time $\beta$ is the total time of transmitting a synchronous packet through a network cable and of processing the synchronous packet within the network unit 31A. Therefore, in the network unit 31A, the time at which a first synchronous packet arrives at the filter units 318-1 and 318-2 is t1+$\beta$. Similarly, the time at which a second synchronous packet arrives at the filter units 318-1 and 318-2 is t2+$\beta$, and the time at which a third synchronous packet arrives at the filter units 318-1 and 318-2 is t3+$\beta$.

As described above, the network unit 31A includes two delay counters 316-1 and 316-2. The filter unit 318-1 is provided for the delay counter 316-1. The filter unit 318-2 is provided for the delay counter 316-2. However, immediately after the start-up, the filter units 318-1 and 318-2 stop operating and thus do not filter a synchronous packet. The window width and the cycle of the filter units 318-1 and 318-2 are assumed to be set in advance.

Figure 4:
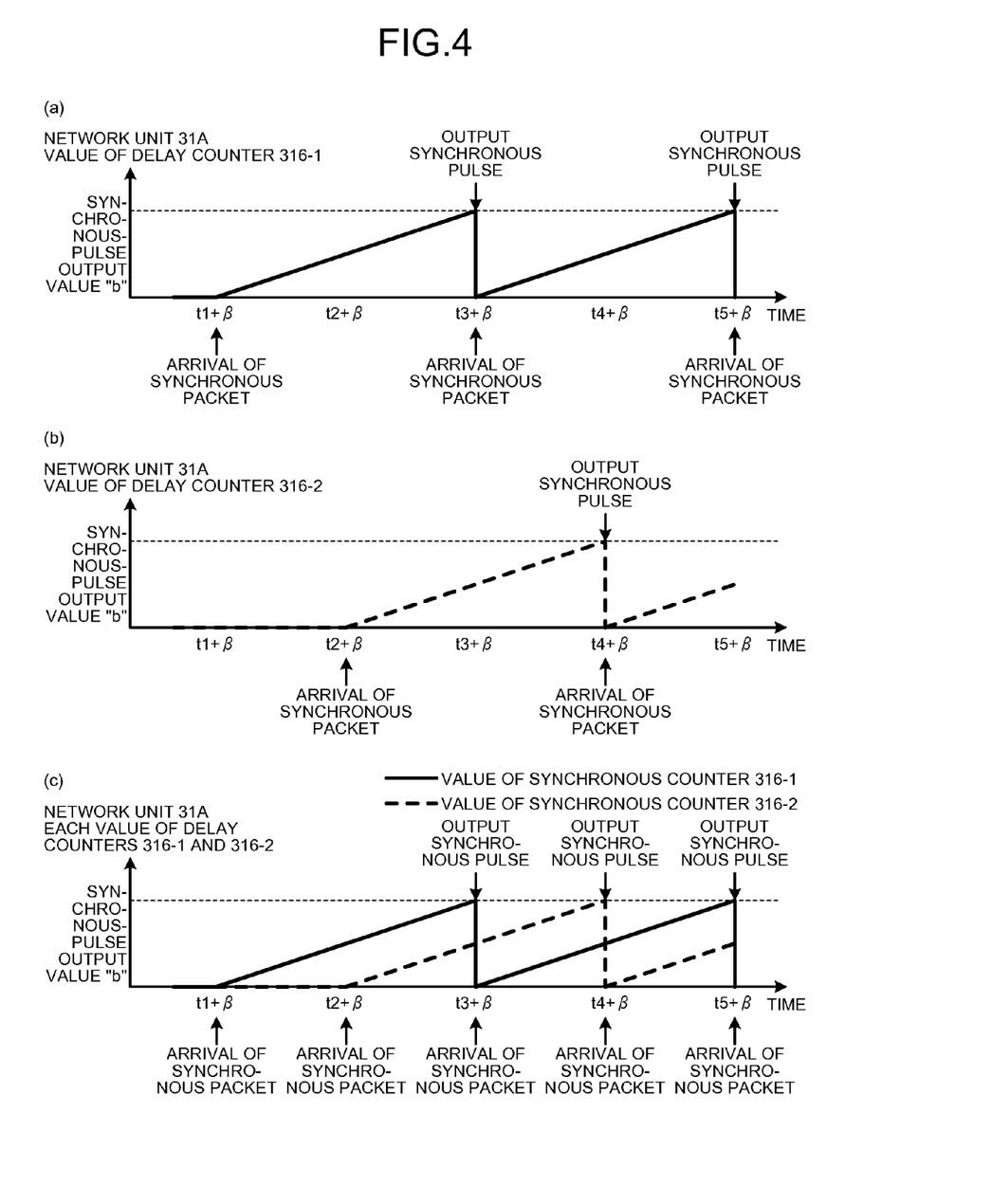
FIG. 4 is a diagram showing an operation example of delay counters in a network unit 31A.

FIG. 4 is a diagram showing an operation example of the delay counters in the network unit 31A. FIG. 4(a) shows an operation of the delay counter 316-1. FIG. 4(b) shows an operation of the delay counter 316-2. FIG. 4(c) displays FIGS. 4(a) and 4(b) that overlap each other. In FIG. 4, the horizontal axis represents time and the vertical axis represents each value of the delay counters 316-1 and 316-2.

As shown in FIG. 4, the two delay counters 316-1 and 316-2 in the network unit 31A do not count up immediately after the start-up. Upon being notified of the arrival of the first synchronous packet at the time t1+$\beta$, the delay-counter control unit 317 clears the delay counter 316-1 and causes the delay counter 316-1 to start counting up. Similarly, at the time t2+$\beta$ at which a synchronous packet arrives, the delay-counter control unit 317 clears the delay counter 316-2 and causes the delay counter 316-2 to start counting up. That is, each of the delay counters 316-1 and 316-2 is reset with a cycle that is twice as long as the synchronous-packet arrival cycle, and their respective resetting (clearing) timings are set with a time lag of half of the resetting cycle. Generally, in a case where the number of delay counters is n (n is an integer of 2 or more), each of the delay counters is reset with a cycle that is n times as long as the synchronous-packet arrival cycle, and their respective resetting timings are set with a time lag of one n-th of the resetting cycle.

The arrival of the first synchronous packet is considered as a starting point to enable the filter units 318-1 and 318-2. That is, in this example, the filter unit 318-1 is enabled by a synchronous packet that arrives at the time t1+$\beta$ and the filter unit 318-2 is enabled by a synchronous packet that arrives at the time t2+$\beta$. Therefore, when a synchronous packet that arrives at the time t3+$\beta$ does not fall within the window width set by the filter unit 318-1, this synchronous packet is discarded.

A synchronous-pulse output value "b" is set in the synchronous-pulse output-value storage unit 319 in the network unit 31A. In the present embodiment, when the period of time t2 has elapsed since the delay counter 316-1 counts up from 0, the value of the delay counter 316-1 becomes equal to the synchronous-pulse output value "b" in the synchronous-pulse output-value storage unit 319.

The delay counter 316-1 is cleared at the time t1+$\beta$ and then counts up. When the value of the delay counter 316-1 becomes equal to the synchronous-pulse output value "b" in the synchronous-pulse output-value storage unit 319, the synchronous-pulse output unit 320 in the network unit 31A outputs a synchronous pulse through the system bus I/F unit 311.

Similarly, when the value of the delay counter 316-2 in the network unit 31A becomes equal to the synchronous-pulse output value "b" in the synchronous-pulse output-value storage unit 319, the synchronous-pulse output unit 320 also outputs a synchronous pulse through the system bus I/F unit 311.

As shown in FIG. 4(c), at the times t3+$\beta$, t5+$\beta$, . . . , the delay counter 316-1 counts the synchronous-pulse output value "b", and at the times t4+$\beta$, . . . , the delay counter 316-2 counts the synchronous-pulse output value "b".

A synchronous pulse output from the network unit 31A is transmitted to the synchronous target 21A, such as a servo drive, that is connected to the system bus 22A to which the network unit 31A is also connected. The synchronous target 21A performs the main-program processing at a timing designated by the synchronous pulse.

Figure 5:
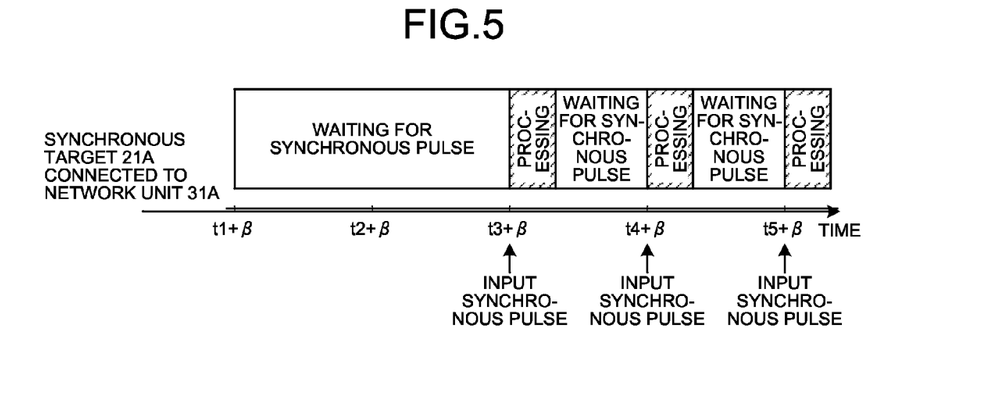
FIG. 5 is a diagram showing an operation example of a synchronous target 21A.

FIG. 5 is a diagram showing an operation example of the synchronous target 21A. As shown in FIG. 5, the synchronous target 21A is in a state of waiting for a synchronous pulse until the time t3+$\beta$ because a synchronous pulse is not input thereto. When a synchronous pulse is input to the synchronous target 21A at the time t3+$\beta$, it performs the main-program processing and then enters a state of waiting for a synchronous pulse. Thereafter, the processing is repeatedly performed, in which a synchronous pulse is input to the synchronous target 21A at the times t4+$\beta$, t5+$\beta$, . . . , and it performs the main-program processing and then enters a state of waiting for a synchronous pulse.

<Operation of Network Unit 31B>

Next, in the network unit 31B, a synchronous packet arrives at the reception port 314. The processing of forwarding the synchronous packet to the transmission port 313 after arriving at the reception port 314 in the network unit 31B and the processing of detecting and analyzing the synchronous packet by the synchronous-packet reception unit 315 and notifying the filter units 318-1 and 318-2 of the arrival of the synchronous packet are the same as those performed in the network unit 31A. Therefore, explanations thereof will be omitted.

The delay time from when a synchronous packet is delivered from the network unit 31M via the network unit 31A to the network unit 31B to when the arrival of the synchronous packet is notified to the filter units 318-1 and 318-2 in the network unit 31B is defined as γ. This delay time γ is the total time from when a synchronous packet is output from the network unit 31M to when the synchronous packet is processed within the network unit 31B after arriving at the network unit 31B via the network unit 31A. Therefore, in the network unit 31B, the time at which a first synchronous packet arrives at the filter units 318-1 and 318-2 is t1+γ. Similarly, the time at which a second synchronous packet arrives at the filter units 318-1 and 318-2 is t2+γ, and the time at which a third synchronous packet arrives at the filter units 318-1 and 318-2 is t3+γ.

Figure 6:
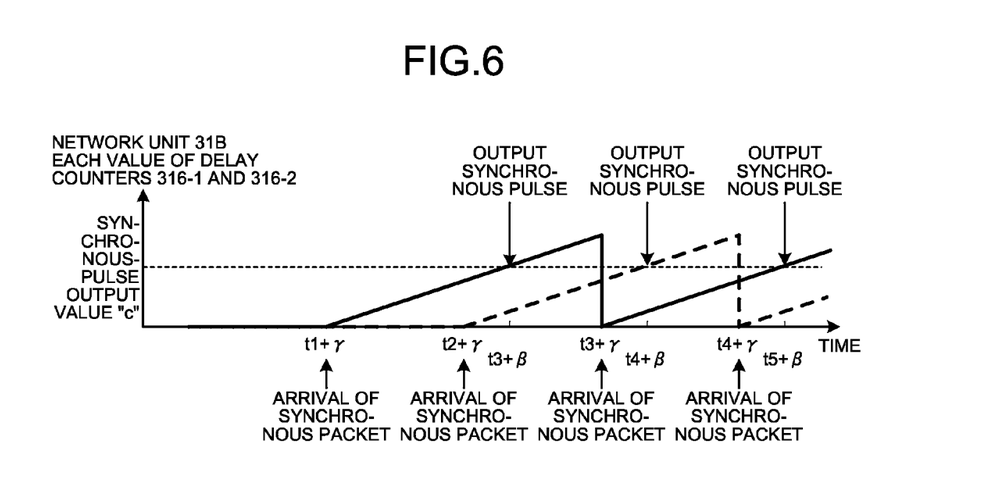
FIG. 6 is a diagram showing an operation example of delay counters in a network unit 31B.

The network unit 31B includes two delay counters 316-1 and 316-2. FIG. 6 is a diagram showing an operation example of delay counters in the network unit 31B. In FIG. 6, the horizontal axis represents time and the vertical axis represents each value of the delay counters 316-1 and 316-2.

These delay counters 316-1 and 316-2 do not count up immediately after the start-up. Upon being notified of the arrival of the first synchronous packet at the time t1+γ, the delay-counter control unit 317 clears the delay counter 316-1 and causes the delay counter 316-1 to start counting up. Similarly, at the time t2+γ at which a synchronous packet arrives, the delay-counter control unit 317 clears the delay counter 316-2 and causes the delay counter 316-2 to start counting up.

The arrival of the first synchronous packet is considered as a starting point to enable the filter units 318-1 and 318-2. That is, in this example, the filter unit 318-1 is enabled by a synchronous packet that arrives at the time t1+γ and the filter unit 318-2 is enabled by a synchronous packet that arrives at the time t2+γ. Therefore, when a synchronous packet that arrives at the time t3+γ does not fall within the window width of the filter unit 318-1, this synchronous packet is discarded.

A synchronous-pulse output value "c" is set in the synchronous-pulse output-value storage unit 319 in the network unit 31B. While the synchronous-pulse output value "c" is set by the communication-delay measurement unit 113 in the synchronous master 11, in the present embodiment, the synchronous-pulse output value "c" is set equal to ⅔×the synchronous-pulse output value "b" in the network unit 31A. Therefore, when the period of time, which is ⅔×t2, has elapsed since the delay counter 316-1 counts up from 0, the value of the delay counter 316-1 becomes equal to the synchronous-pulse output value "c".

The delay counter 316-1 is cleared at the time t1+γ and then counts up. When the value of the delay counter 316-1 becomes equal to the synchronous-pulse output value "c" in the synchronous-pulse output-value storage unit 319 at the time t3+β, the synchronous-pulse output unit 320 in the network unit 31B outputs a synchronous pulse through the system bus I/F unit 311.

Similarly, the delay counter 316-2 is cleared at the time t2+γ and then counts up. When the value of the delay counter 316-2 becomes equal to the synchronous-pulse output value "c" in the synchronous-pulse output-value storage unit 319 at the time t4+β, the synchronous-pulse output unit 320 in the network unit 31B also outputs a synchronous pulse through the system bus I/F unit 311.

As shown in FIG. 6, at the times t3+β, t5+β, . . . , the delay counter 316-1 counts the synchronous-pulse output value "c", and at the times t4+β, . . . , the delay counter 316-2 counts the synchronous-pulse output value "c". The synchronous-pulse output value "c" in the synchronous-pulse output-value storage unit 319 is set in consideration of a delay relative to the network unit 31A. Therefore, a synchronous pulse is output from the network unit 31B at the same time as from the network unit 31A.

The synchronous pulse output from the network unit 31B is transmitted to the synchronous target 21B, such as a servo drive, that is connected to the system bus 22B to which the network unit 31B is also connected. The synchronous target 21B performs the main-program processing at a timing designated by the synchronous pulse.

Figure 7:
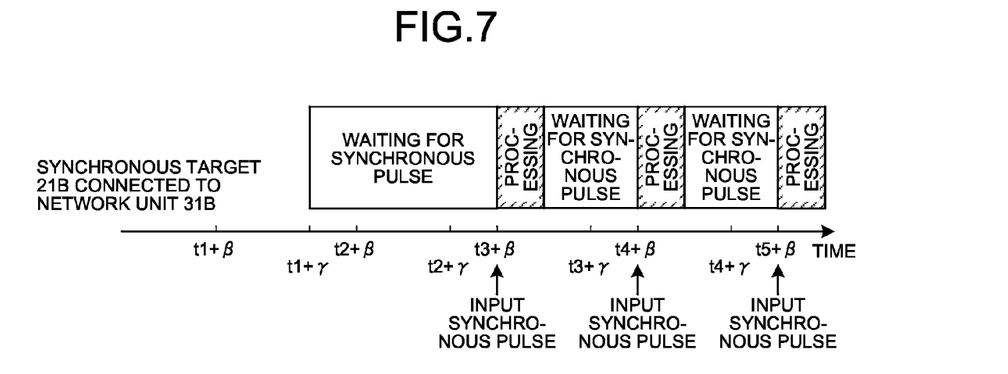
FIG. 7 is a diagram showing an operation example of a synchronous target 21B.

FIG. 7 is a diagram showing an operation example of the synchronous target 21B. As shown in FIG. 7, the synchronous target 21B is in a state of waiting for a synchronous pulse until the time t3+β because a synchronous pulse is not input thereto. When a synchronous pulse is input to the synchronous target 21B at the time t3+β, it performs the main-program processing and then enters a state of waiting for a synchronous pulse. Thereafter, the processing is repeatedly performed, in which a synchronous pulse is input to the synchronous target 21B at the times t4+β, t5+β, . . . , and it performs the main-program processing and then enters a state of waiting for a synchronous pulse.

<Operation of Network Unit 31C>

Similarly, in the network unit 31C, a synchronous packet arrives at the reception port 314. The processing of forwarding the synchronous packet to the transmission port 313 after arriving at the reception port 314 in the network unit 31C and the processing of detecting and analyzing the synchronous packet by the synchronous-packet reception unit 315 and notifying the filter units 318-1 and 318-2 of the arrival of the synchronous packet are the same as those performed in the network units 31A and 31B. Therefore, explanations thereof will be omitted.

The delay time from when a synchronous packet is delivered from the network unit 31M via the network units 31A and 31B to the network unit 31C to when the arrival of the synchronous packet is notified to the filter units 318-1 and 318-2 in the network unit 31C is defined as δ. This delay time δ is the total time from when a synchronous packet is output from the network unit 31M to when the synchronous packet is processed within the network unit 31C after arriving at the network unit 31C via the network units 31A and 31B. Therefore, in the network unit 31C, the time at which a first synchronous packet arrives at the filter units 318-1 and 318-2 is t1+δ. Similarly, the time at which a second synchronous packet arrives at the filter units 318-1 and 318-2 is t2+δ, and the time at which a third synchronous packet arrives at the filter units 318-1 and 318-2 is t3+δ.

Figure 8:
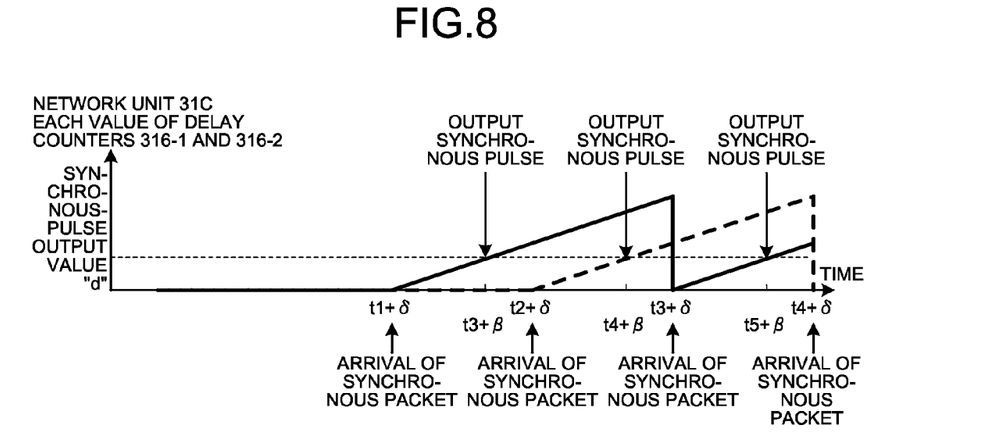
FIG. 8 is a diagram showing an operation example of delay counters in a network unit 31C.

The network unit 31C includes two delay counters 316-1 and 316-2. FIG. 8 is a diagram showing an operation example of delay counters in the network unit 31C. In FIG.

8, the horizontal axis represents time and the vertical axis represents each value of the delay counters 316-1 and 316-2.

These delay counters 316-1 and 316-2 do not count up immediately after the start-up. Upon being notified of the arrival of the first synchronous packet at the time t1+δ, the delay-counter control unit 317 clears the delay counter 316-1 and causes the delay counter 316-1 to start counting up. Similarly, at the time t2+δ at which a synchronous packet arrives, the delay-counter control unit 317 clears the delay counter 316-2 and causes the delay counter 316-2 to start counting up.

The arrival of the first synchronous packet is considered as a starting point to enable the filter units 318-1 and 318-2. That is, in this example, the filter unit 318-1 is enabled by a synchronous packet that arrives at the time t1+δ and the filter unit 318-2 is enabled by a synchronous packet that arrives at the time t2+δ. Therefore, when a synchronous packet that arrives at the time t3+δ does not fall within the window width of the filter unit 318-1, this synchronous packet is discarded.

A synchronous-pulse output value "d" is set in the synchronous-pulse output-value storage unit 319 in the network unit 31C. While the synchronous-pulse output value "d" is set by the communication-delay measurement unit 113 in the synchronous master 11, in the present embodiment, the synchronous-pulse output value "d" is set equal to ⅓×the synchronous-pulse output value "b" in the network unit 31A. Therefore, when the period of time, which is ⅓×t2, has elapsed since the delay counter 316-1 counts up from 0, the value of the delay counter 316-1 becomes equal to the synchronous-pulse output value "d".

The delay counter 316-1 is cleared at the time t1+δ and then counts up. When the value of the delay counter 316-1 becomes equal to the synchronous-pulse output value "d" in the synchronous-pulse output-value storage unit 319 at the time t3+β, the synchronous-pulse output unit 320 in the network unit 31C outputs a synchronous pulse through the system bus I/F unit 311.

Similarly, the delay counter 316-2 is cleared at the time t2+δ and then counts up. When the value of the delay counter 316-2 becomes equal to the synchronous-pulse output value "d" in the synchronous-pulse output-value storage unit 319 at the time t4+β, the synchronous-pulse output unit 320 also outputs a synchronous pulse through the system bus I/F unit 311.

As shown in FIG. 8, at the times t3+β, t5+β, . . . , the delay counter 316-1 counts the synchronous-pulse output value "d", and at the times t4+β, . . . , the delay counter 316-2 counts the synchronous-pulse output value "d". The synchronous-pulse output value "d" in the synchronous-pulse output-value storage unit 319 is set in consideration of a delay relative to the network unit 31A. Therefore, a synchronous pulse is output from the network unit 31C at the same time as from the network units 31A and 31B.

The synchronous pulse output from the network unit 31C is transmitted to the synchronous target 21C, such as a servo drive, that is connected to the system bus 22C to which the network unit 31C is also connected. The synchronous target 21C performs the main-program processing at a timing designated by the synchronous pulse.

Figure 9:
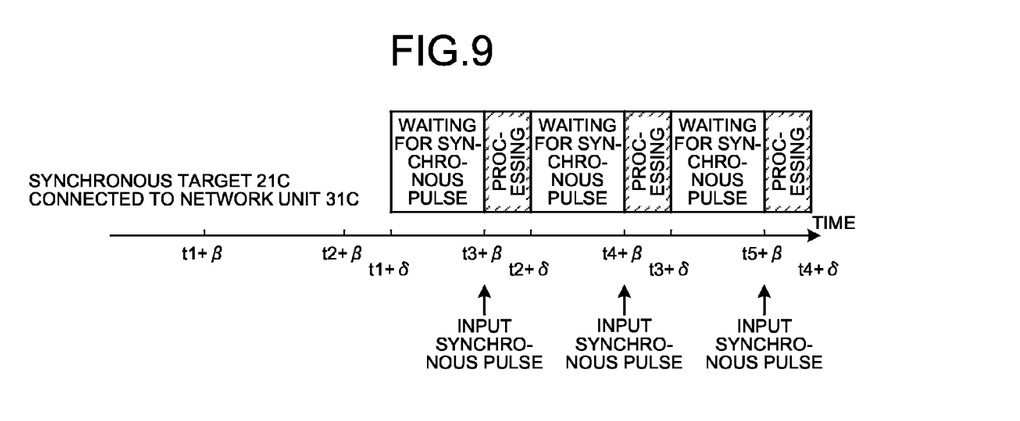
FIG. 9 is a diagram showing an operation example of a synchronous target 21C.

FIG. 9 is a diagram showing an operation example of the synchronous target 21C. As shown in FIG. 9, the synchronous target 21C is in a state of waiting for a synchronous pulse until the time t3+β because a synchronous pulse is not input thereto. When a synchronous pulse is input to the synchronous target 21C at the time t3+β, it performs the main-program processing and then enters a state of waiting for a synchronous pulse. Thereafter, the processing is repeatedly performed, in which a synchronous pulse is input to the synchronous target 21C at the times t4+β, t5+β, . . . , and it performs the main-program processing and then enters a state of waiting for a synchronous pulse.

<Operation of Network Unit 31D>

Similarly, in the network unit 31D, a synchronous packet arrives at the reception port 314. The processing of forwarding the synchronous packet to the transmission port 313 after arriving at the reception port 314 in the network unit 31D and the processing of detecting and analyzing the synchronous packet by the synchronous-packet reception unit 315 and notifying the filter units 318-1 and 318-2 of the arrival of the synchronous packet are the same as those performed in the network units 31A to 31C. Therefore, explanations thereof will be omitted.

The delay time from when a synchronous packet is delivered from the network unit 31M via the network units 31A, 31B, and 31C to the network unit 31D to when the arrival of the synchronous packet is notified to the filter units 318-1 and 318-2 in the network unit 31D is defined as ε. This delay time ε is the total time from when a synchronous packet is output from the network unit 31M to when the synchronous packet is processed within the network unit 31D after arriving at the network unit 31D via the network units 31A, 31B, and 31C. Therefore, in the network unit 31D, the time at which a first synchronous packet arrives at the filter units 318-1 and 318-2 is t1+ε. Similarly, the time at which a second synchronous packet arrives at the filter units 318-1 and 318-2 is t2+ε, and the time at which a third synchronous packet arrives at the filter units 318-1 and 318-2 is t3+ε.

Figure 10:
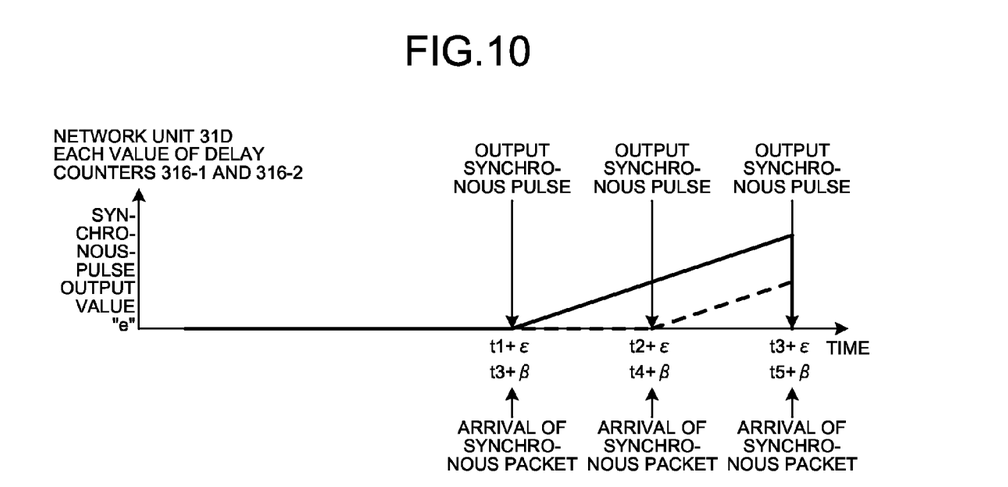
FIG. 10 is a diagram showing an operation example of delay counters in a network unit 31D.

The network unit 31D includes two delay counters 316-1 and 316-2. FIG. 10 is a diagram showing an operation example of delay counters in the network unit 31D. In FIG. 10, the horizontal axis represents time and the vertical axis represents each value of the delay counters 316-1 and 316-2.

These delay counters 316-1 and 316-2 do not count up immediately after the start-up. Upon being notified of the arrival of the first synchronous packet at the time t1+ε, the delay-counter control unit 317 clears the delay counter 316-1 and causes the delay counter 316-1 to start counting up. Similarly, at the time t2+ε at which a synchronous packet arrives, the delay-counter control unit 317 clears the delay counter 316-2 and causes the delay counter 316-2 to start counting up.

The arrival of the first synchronous packet is considered as a starting point to enable the filter units 318-1 and 318-2. That is, in this example, the filter unit 318-1 is enabled by a synchronous packet that arrives at the time t1+ε and the filter unit 318-2 is enabled by a synchronous packet that arrives at the time t2+ε. Therefore, when a synchronous packet that arrives at the time t3+ε does not fall within the window width of the filter unit 318-1, this synchronous packet is discarded.

A synchronous-pulse output value "e" is set in the synchronous-pulse output-value storage unit 319 in the network unit 31D. While the synchronous-pulse output value "e" is set by the communication-delay measurement unit 113 in the synchronous master 11, in the present embodiment, the synchronous-pulse output value "e" is set equal to ⅔×the synchronous-pulse output value "b" in the network unit 31A. Therefore, when the value of the delay counter 316-1 becomes equal to 0, this value becomes equal to the synchronous-pulse output value "e".

That is, the delay counter 316-1 is cleared at the time t1+ε to count up, and simultaneously, the value of the delay counter 316-1 becomes equal to the synchronous-pulse output value "e" in the synchronous-pulse output-value storage unit 319. The synchronous-pulse output unit 320 in the network unit 31D outputs a synchronous pulse through the system bus I/F unit 311 at the time t3+β. Thereafter, the delay counter 316-1 counts up.

The delay counter 316-2 is cleared at the time t2+ϵ to count up, and simultaneously, the value of the delay counter 316-2 becomes equal to the synchronous-pulse output value "e" in the synchronous-pulse output-value storage unit 319. The synchronous-pulse output unit 320 outputs a synchronous pulse through the system bus I/F unit 311 at the time t4+β. Thereafter, the delay counter 316-2 counts up.

As shown in FIG. 10, at the times t3+β (=t1+ϵ), t5+β (=t3+ϵ), . . . , the delay counter 316-1 counts the synchronous-pulse output value "e", and at the times t4+β (=t2+ϵ), . . . , the delay counter 316-2 counts the synchronous-pulse output value "e". The synchronous-pulse output value "e" in the synchronous-pulse output-value storage unit 319 is set in consideration of a delay relative to the network unit 31A. Therefore, a synchronous pulse is output from the network unit 31D at the same time as from the network units 31A to 31C.

The synchronous pulse output from the network unit 31D is transmitted to the synchronous target 21D, such as a servo drive, that is connected to the system bus 22D to which the network unit 31D is also connected. The synchronous target 21D performs the main-program processing at a timing designated by the synchronous pulse.

Figure 11:
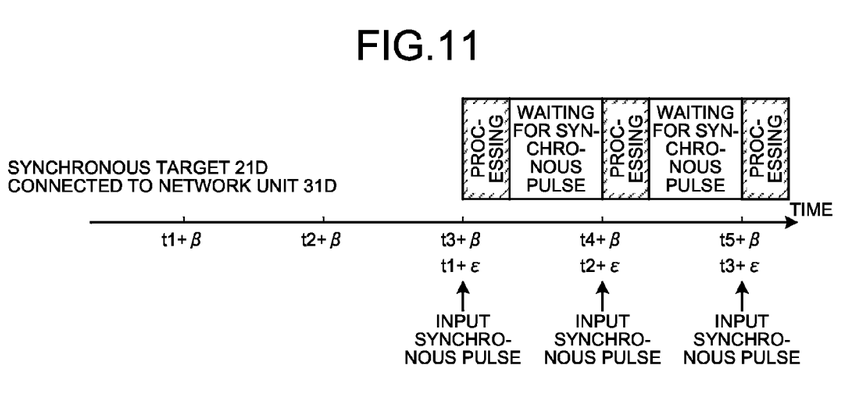
FIG. 11 is a diagram showing an operation example of a synchronous target 21D.

FIG. 11 is a diagram showing an operation example of the synchronous target 21D. As shown in FIG. 11, the delay counter 316-1 is not in a count-up state until the time t3+β, and simultaneously with an input of a synchronous pulse at the time t3+β, the synchronous target 21D performs the main-program processing and then enters a state of waiting for a synchronous pulse. Thereafter, the processing is repeatedly performed, in which a synchronous pulse is input to the synchronous target 21D at the times t4+β, t5+β, . . . , and it performs the main-program processing and then enters a state of waiting for a synchronous pulse.

<Summary of Operations>

Figure 12:
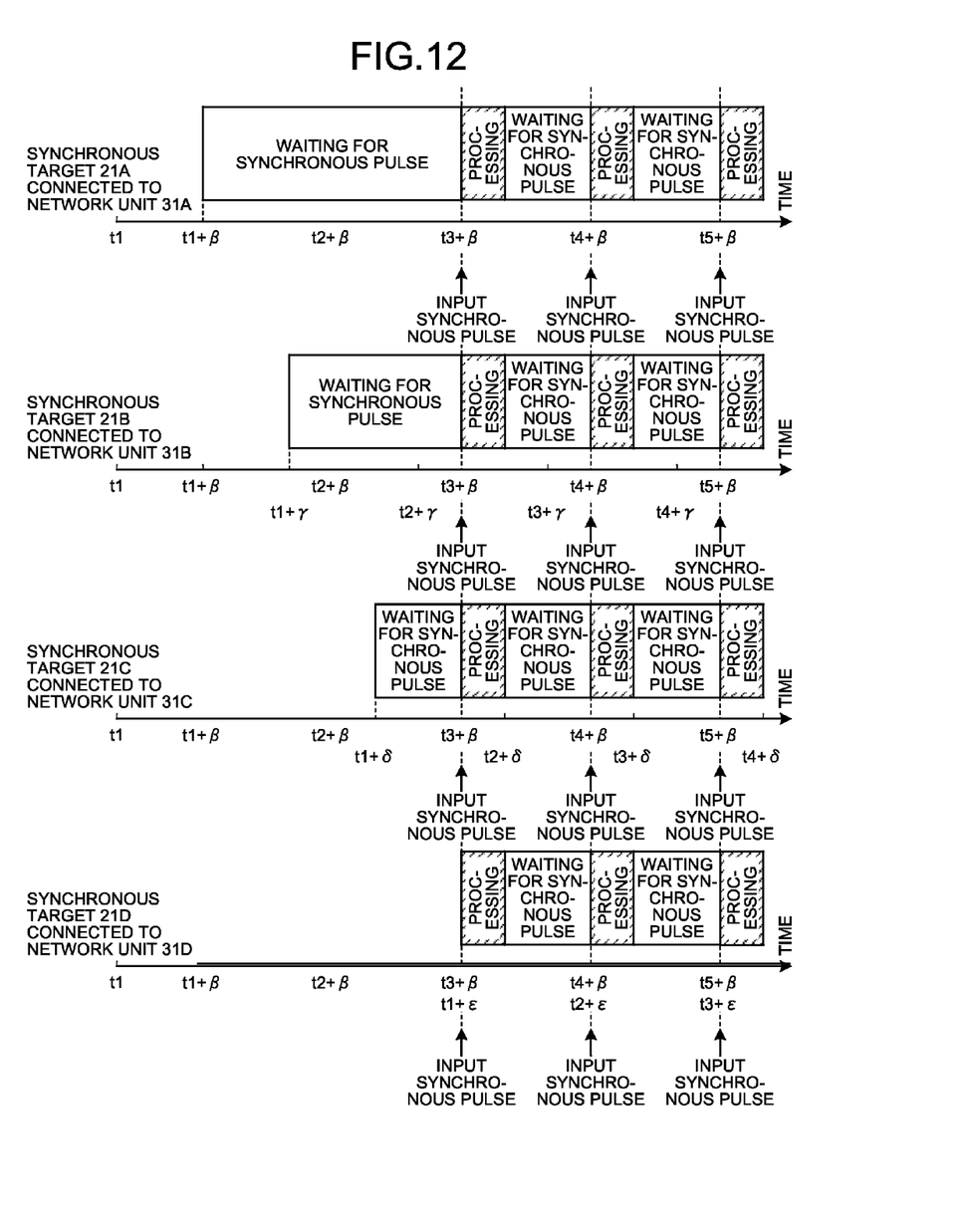
FIG. 12 is a diagram showing an operation example of each synchronous target in a motion control system according to the embodiment.

FIG. 12 is a diagram showing an operation example of each synchronous target in the motion control system according to the present embodiment. FIG. 12 shows FIGS. 5, 7, 9, and 11 all together. As shown in FIG. 12, it is possible for the network units 31A to 31D to synchronize with each other with a cycle that is shorter than the delay time (ϵ−β) from the network unit 31A, arranged at a location that is physically closest (with the shortest wire) to the synchronous master 11, to the network unit 31D, arranged at a location that is physically furthest (with the longest wire) from the synchronous master 11. This is because two delay counters 316-1 and 316-2 are provided in each of the network units 31A to 31D so as to reset the delay counters 316-1 and 316-2 at different timings with a cycle that is twice as long as the synchronous-packet receiving cycle, and because in each of the network units 31A to 31D, a synchronous pulse is output when each value of the delay counters 316-1 and 316-2 corresponds with a synchronous-pulse output value that takes into account a delay from the network unit 31A.

Figure 13:
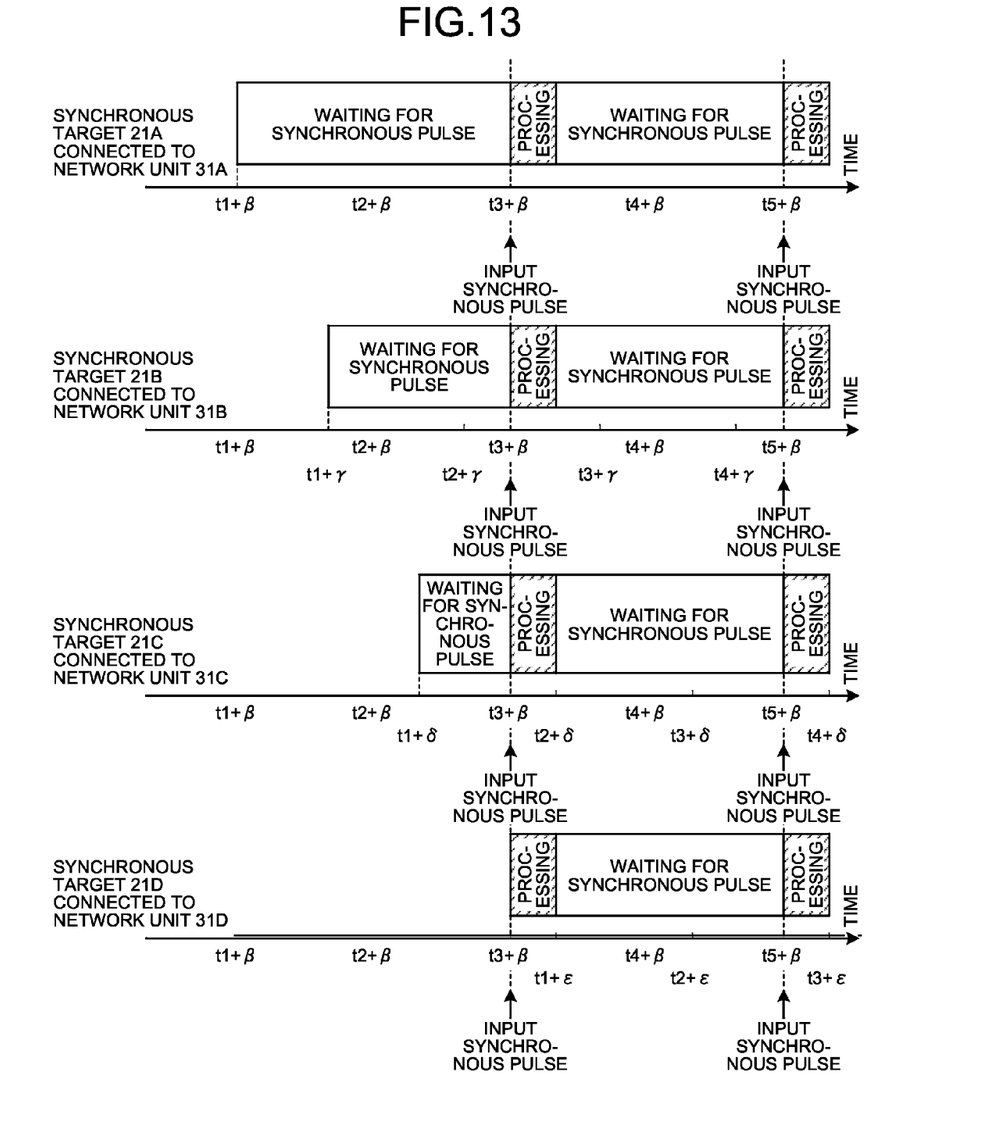
FIG. 13 is a diagram showing an operation example of each synchronous target in a motion control system according to a general method.

FIG. 13 is a diagram showing an operation example of each synchronous target in a motion control system according to a general method. FIG. 13 shows a case where each network unit includes only a single delay counter as described in Patent Literature 1. As shown in FIG. 13, according to the conventional technique, synchronous targets synchronize with each other with a cycle that is equal to or longer than the delay time (ϵ−β) from the network unit 31A, arranged at a location that is physically closest to the synchronous master 11, to the network unit 31D, arranged at a location that is physically furthest from the synchronous master 11.

While in the above example, the case is shown in which two delay counters are provided in a network unit, three or more delay counters can be provided.

As described above, in the present embodiment, in each of the network unit 31M and the network units 31A to 31D connected to the motion control system, n (n is an integer of 2 or more) delay counters 316-1 and 316-2 are provided. The delay-counter control unit 317 causes the delay counters 316-1 and 316-2 to count the cycle that is n times as long as a predetermined cycle of a synchronous-pulse signal output from the synchronous master 11, and resets the delay counters 316-1 and 316-2 at different timings. During counting in each of the delay counters 316-1 and 316-2, a synchronous-pulse output value is set for each of the network units 31B to 31D according to the delay time from the network unit 31A arranged at a location that is physically closest to the synchronous master 11. When each value of the delay counters 316-1 and 316-2 becomes the synchronous-pulse output value after the count is reset, the synchronous-pulse output unit 320 outputs a synchronous pulse to the synchronous targets 21A to 21D.

Therefore, the synchronous targets 21A to 21D, which are connected respectively to the network units 31A to 31D, can synchronize with each other. Also, each of the delay counters 316-1 and 316-2 counts the period of time equal to or longer than the delay time (ϵ−β) from the network unit 31A, arranged at a location that is physically closest to the synchronous master 11, to the network unit 31D, arranged at a location that is physically furthest from the synchronous master 11. However, a synchronous pulse can be output to the synchronous targets 21A to 21D at intervals, each of the intervals being shorter than the delay time (ϵ−β) from the network unit 31A to the network unit 31D. That is, an effect is obtained where, in the case with the delay counters 316-1 and 316-2, a synchronous pulse can be output with a shorter cycle than the case with only a single delay counter.

As a result, in the motion control system, as the communication distance between the motion controller that is the synchronous master 11 and the servo drives that are the synchronous targets 21A to 21D is extended or as the number of the servo drives is increased, a delay time is increased in the servo drive located physically furthest from the motion controller, and even in that case, an effect is obtained where the motion control system can still execute the control of the servo drives with a desired cycle.

In addition, an ideal system that can measure a correct delay time with no jitter and the like includes the optimum number of the delay counters 316-1 and 316-2, and therefore can reduce the delay waiting time to zero.

INDUSTRIAL APPLICABILITY

As described above, the communication device according to the present invention is useful as a communication device used in a distributed motion controller system that executes parallel processing control, and is particularly suitable for a communication device that executes synchronous motion control through a network.

REFERENCE SIGNS LIST 11 synchronous master, 12, 22A to 22D system bus, 21A to 21D synchronous target, 31M, 31A to 31D network unit, 40 network, 111 interval timer, 112, 311 system bus I/F unit, 113 communication-delay measurement unit, 312 synchronous-packet transmission unit, 313 transmission port, 314 reception port, 315 synchronous-packet reception unit, 316-1, 316-2 delay counter, 317 delay-counter control unit, 318-1, 318-2 filter unit, 319 synchronous-pulse output-value storage unit, 320 synchronous-pulse output unit.

The invention claimed is:

1. A communication device comprising:
   a first communication unit that communicates with another communication device;
   a second communication unit that communicates with a synchronous target;
   n (n is an integer of 2 or more) counters that count a predetermined period of time;
   a counter control unit that, upon receiving a synchronous packet input with a predetermined cycle from the first communication unit, causes the counters to count a cycle that is n times as long as the predetermined cycle and controls the counters such that counts of the counters are cleared at different timings; and
   a synchronous-pulse output unit that outputs a synchronous pulse to the synchronous target through the second communication unit when there is a counter whose count value after being cleared becomes equal to a synchronous-pulse output value.

2. The communication device according to claim 1, further comprising a filter unit that restricts a timing of clearing a count of the counter within a predetermined time range with reference to a time when the cycle that is n times as long as the predetermined cycle has elapsed since the counter starts counting, wherein
   the filter unit is provided to each of the counters.

3. The control device according to claim 1, further comprising:
   a synchronous-packet transmission unit that causes clear-counter designation information to be included in the synchronous packet, where the clear-counter designation information designates a counter whose count is to be cleared among the n counters; and
   a synchronous-packet reception unit that, upon receiving the synchronous packet, notifies the counter control unit of a counter designated by the clear-counter designation information in the synchronous packet having been received, wherein
   the counter control unit clears a count of the counter, the counter control unit being notified of the counter from the synchronous-packet reception unit.

4. A communication system in which a first communication device connected to a synchronous master that outputs a synchronous pulse regularly and a plurality of second communication devices connected to a synchronous target are connected through a network, wherein
   the synchronous master includes
      a synchronous-signal transmission unit that outputs a synchronous pulse with a predetermined cycle, and
      a communication-delay-time measurement unit that measures a communication delay time from the synchronous master to the second communication devices connected to the synchronous target and that sets a synchronous-pulse output value calculated on a basis of the communication delay time for each of the second communication devices,
   the first communication device includes a synchronous-packet transmission unit that transmits a synchronous packet to all the second communication devices connected to the network upon receiving the synchronous pulse from the synchronous master, and
   the second communication device includes
      a first communication unit that communicates with the first communication device or another second communication device,
      a second communication unit that communicates with the synchronous target,
      n (n is an integer of 2 or more) counters that count a predetermined period of time,
      a counter control unit that, upon receiving the synchronous packet from the first communication unit with a predetermined cycle, causes the counters to count a cycle that is n times as long as the predetermined cycle and controls the counters such that counts of the counters are cleared at different timings, and
      a synchronous-pulse output unit that outputs a synchronous pulse to the synchronous target through the second communication unit when there is a counter whose count value after being cleared becomes equal to the synchronous-pulse output value.

5. The communication system according to claim 4, wherein the second communication device further includes, for each of the counters, a filter unit that restricts a timing of clearing a count of the counter within a predetermined time range with reference to a time when the cycle that is n times as long as the predetermined cycle has elapsed since the counter starts counting.

6. The communication system according to claim 4, wherein
   the second communication device further includes
      a synchronous-packet transmission unit that causes clear-counter designation information to be included in the synchronous packet, where the clear-counter designation information designates a counter whose count is to be cleared among the n counters in the second communication device, and
      a synchronous-packet reception unit that, upon receiving the synchronous packet, notifies the counter control unit of a counter designated by the clear-counter designation information in the synchronous packet having been received, and
   the counter control unit clears a count of the counter, the counter control unit being notified of the counter from the synchronous-packet reception unit.

7. The communication system according to claim 4, wherein
   the synchronous master and the first communication device are connected through a system bus, and
   the synchronous target and the second communication devices are connected through a system bus.

8. The communication system according to claim 4, wherein a cycle of the synchronous pulse is shorter than a delay time in the second communication device that is located such that a length from the first communication device connected through the network is longest relative to the second communication device that is located such that a length from the first communication device connected through the network is shortest.

9. A synchronous control method in a communication system in which a first communication device connected to a synchronous master that outputs a synchronous pulse regularly and a plurality of second communication devices connected to a synchronous target are connected through a network, the method comprising:
   a first step of, by the first communication device, transmitting a synchronous packet to all the second communication devices connected through the network upon receiving the synchronous pulse from the synchronous master;

a second step of, by the second communication device, clearing, among n (n is an integer of 2 or more) counters, a counter that has counted the number equal to a synchronous-pulse output value and starting counting anew upon receiving the synchronous packet; and a third step of, by the second communication device, outputting a synchronous pulse to the synchronous target connected to the second communication device when, among the n counters, there is the counter that has counted a value equal to a synchronous-pulse output value that is set according to a length from the synchronous master connected through the network.

* * * * *